United States Patent [19]
Jang

[11] Patent Number: 5,358,216
[45] Date of Patent: Oct. 25, 1994

[54] FOOT-OPERATED VALVE

[76] Inventor: Fang-Shyong Jang, No. 11, Lane 105, Tung-An St., Feng-Yuan City, Taichung Hsien, Taiwan

[21] Appl. No.: 199,885

[22] Filed: Feb. 22, 1994

[51] Int. Cl.⁵ .............................................. F16K 31/62
[52] U.S. Cl. .................................. 251/295; 251/318; 251/336
[58] Field of Search ............... 251/295, 318, 324, 336

[56] References Cited

U.S. PATENT DOCUMENTS

| | | | |
|---|---|---|---|
| 1,153,759 | 9/1915 | Brunker et al. | 251/295 X |
| 2,268,699 | 1/1942 | Cotner | 251/295 X |
| 2,287,011 | 6/1942 | Beebe | 251/295 X |
| 2,693,716 | 11/1954 | Ludwig | 251/295 X |
| 3,039,193 | 6/1962 | Williams | 251/295 X |
| 3,242,572 | 3/1966 | Staunt | 251/295 X |
| 4,089,619 | 5/1978 | Young et al. | 251/295 X |

*Primary Examiner*—John Rivell
*Attorney, Agent, or Firm*—Finnegan, Henderson, Farabow, Garrett & Dunner

[57] ABSTRACT

A foot-operated valve has a valve housing formed with a longitudinal bore which includes a front section and a rear section that has an internal diameter wider than that of the front section to form a shoulder which serves as a valve seat therebetween. The longitudinal bore has an open front end and a closed rear end. A valve stem extends into the longitudinal bore and is provided with a valve disc which is disposed in the rear section of the longitudinal bore. A valve stem has a front portion which extends sealingly through the open front end of the longitudinal bore. The valve disc is biased to abut normally against the valve seat so as to block normally communication between the front and rear sections of the longitudinal bore. A base has the valve housing secured thereon. The base is provided with an upwardly extending mounting seat disposed adjacent to the valve housing and formed with a cylindrical hole that is aligned with the valve stem. A push rod is received slidably in the cylindrical hole and has a head portion and a shank portion. The shank portion abuts against the front portion of the valve stem. A pedal has a rear end connected pivotally to the mounting seat and a bottom surface provided with a downwardly extending push plate that abuts against the head portion of the push rod.

5 Claims, 4 Drawing Sheets

FOOT-OPERATED VALVE

BACKGROUND OF THE INVENTION

1. Field of the Invention

The invention relates to a valve, more particularly to a foot-operated valve for faucets and the like.

2. Description of the Related Art

Presently, the control of water flow through most faucets installed in public places, such as in hospitals and public toilets, is usually accomplished by rotating a handle or by applying pressure on a lever. Thus, the risk of being infected with a disease is relatively high because of the need to operate the faucet by hand. In order to overcome this drawback, some establishments have installed faucets which incorporate a sensor to control water flow. However, such faucets can only provide a predetermined amount of water when in use and is incapable of satisfying the water needs of different people.

SUMMARY OF THE INVENTION

Therefore, the objective of the present invention is to provide a foot-operated valve to be incorporated in faucet and the like so as to overcome the above mentioned drawbacks commonly associated with the prior art.

Accordingly, the foot-operated valve of the present invention comprises a valve housing, a valve stem, a spring means, a base, a push rod and a pedal. The valve housing is formed with a longitudinal bore which includes a front section and a rear section that has an internal diameter wider than that of the front section to form a shoulder which serves as a valve seat therebetween. The longitudinal bore has an open front end and a closed rear end. The valve housing is further formed with a water inlet hole that is communicated with the rear section of the longitudinal bore, and a water outlet hole that is communicated with the front section of the longitudinal bore. The valve stem extends into the longitudinal bore and is provided with a valve disc which is disposed in the rear section of the longitudinal bore. The valve stem has a front portion which extends sealingly through the open front end of the longitudinal bore. The spring means biases the valve disc to abut normally against the valve seat so as to block normally communication between the front and rear sections of the longitudinal bore. The base has the valve housing secured thereon. The base is provided with an upwardly extending mounting seat disposed adjacent to the valve housing and formed with a cylindrical hole that is aligned with the valve stem. The push rod is received slidably in the cylindrical hole and has a head portion and a shank portion. The shank portion abuts against the front portion of the valve stem. The pedal has a rear end connected pivotally to the mounting seat and a bottom surface provided with a downwardly extending push plate that abuts against the head portion of the push rod. Application of pressure on the pedal causes the pedal to pivot, thereby causing the push plate to push the push rod further into the cylindrical hole so as to push the valve stem inwardly of the longitudinal bore to move the valve disc away from the valve seat against action of the first spring means to permit water entering the rear section of the longitudinal bore via the water inlet hole to flow through the water outlet hole via the front section of the longitudinal bore.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
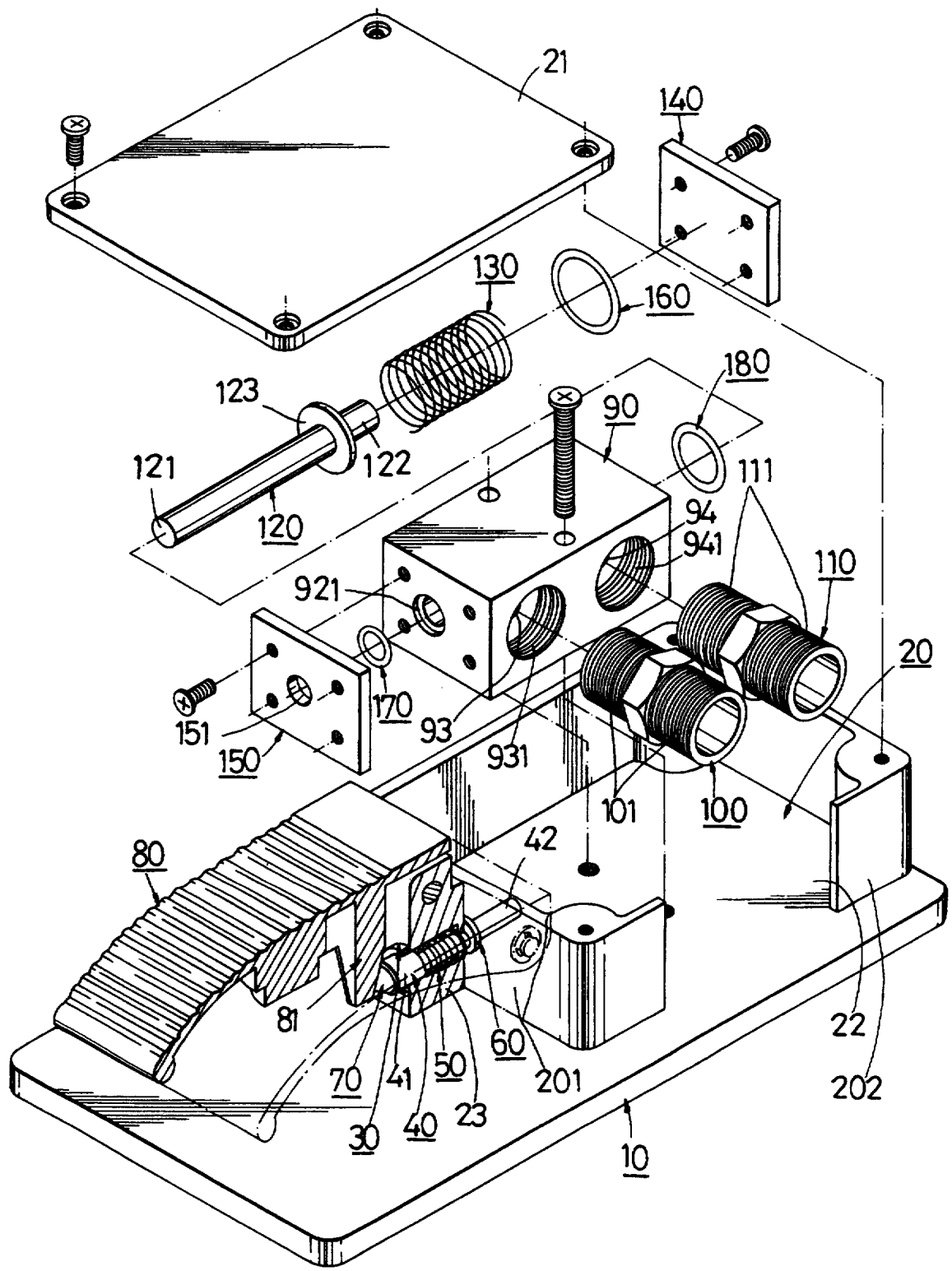
FIG. 1 is an exploded view of the preferred embodiment of a foot-operated valve according to the present invention.
Figure 3:
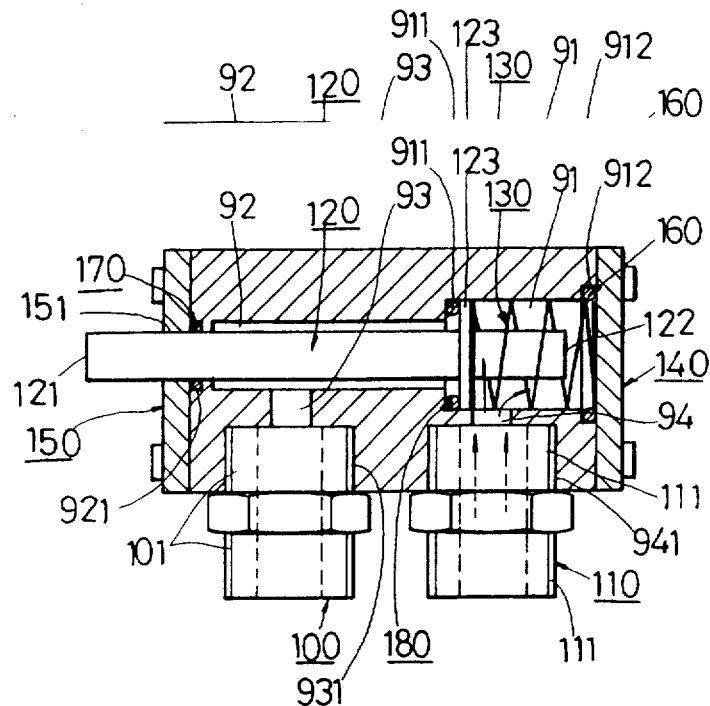
FIG. 3 is partly sectional view of a valve housing of the preferred embodiment to illustrate the latter when in a closed state.
Figure 4:
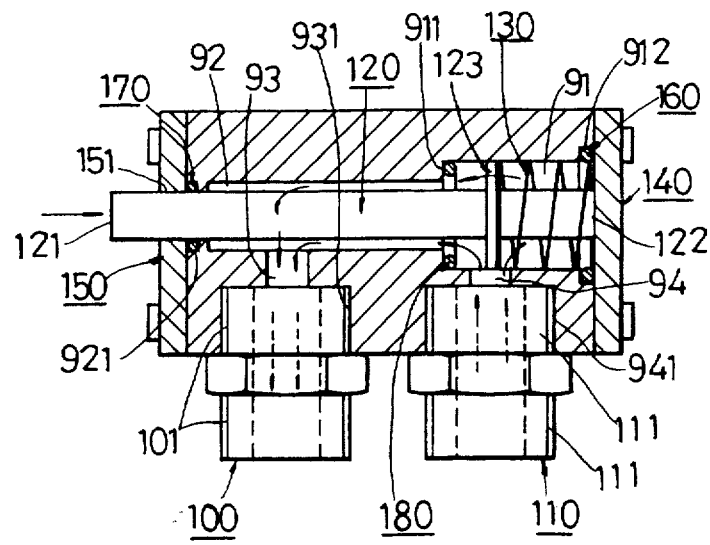
FIG. 4 is a partly sectional view of the valve housing to illustrate the preferred embodiment when in an opened state.
Figure 5:
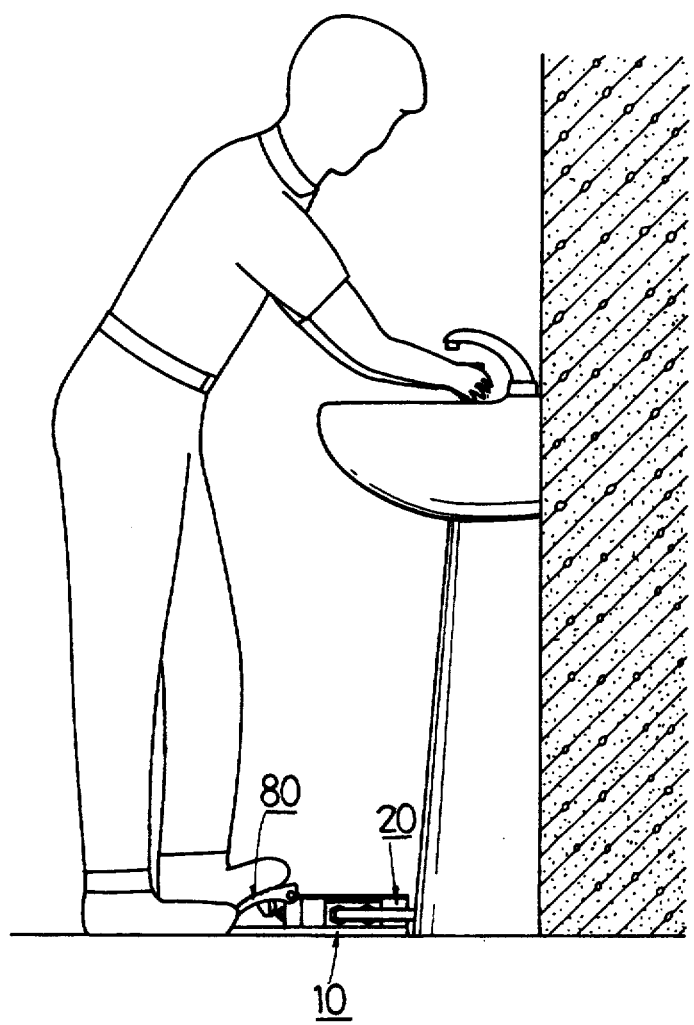
FIG. 5 illustrates a faucet which incorporates the foot-operated valve of the present invention when in use.

Referring to FIGS. 1 and 3, the preferred embodiment of a foot-operated valve according to the present invention is shown to comprise a base 10, a push rod 40, a pedal 80, and a valve housing 90.

The base 10 is provided with an upwardly projecting rectangular frame 20. A cover plate 21 is mounted on an open top end of the frame 20 so as to cover the same. The base 10 is further provided with an upwardly extending mounting seat 23 adjacent to a front wall 201 of the frame 20. The frame 20 further has a side wall 202 that is formed with an opening 22.

The valve housing 90 is formed as a rectangular block that is made of plastic steel. The valve housing 90 is formed with a longitudinal through bore which includes a front section 92 and a rear section 91 that has an internal diameter wider than that of the front section 92, thereby forming a shoulder which serves as a valve seat 911 therebetween. Front and rear covers 150, 140 are mounted respectively on front and rear ends of the valve housing 90. Annular grooves 921, 912 are formed in the front and rear ends of the valve housing 90 and receive a respective sealing ring 170, 160 therein. The sealing rings 170, 160 abut tightly against the front and rear covers 150, 140 to prevent water from leaking out of the valve housing 90.

The valve housing 90 is further formed with a water inlet hole 94 that is transverse to and communicated with the rear section 91 of the through bore, and a water outlet hole 93 that is transverse to and communicated with the front section 92 of the through bore. The water inlet hole 94 and the water outlet hole 93 are respectively provided with an internal screw thread 941, 931. Each of a pair of tube connectors 100, 110 has two threaded ends 101, 111, one of which for engaging threadedly the internal screw thread 941, 931 of a corresponding one of the water inlet and outlet holes 94, 93, the other one of which engaging threadedly a corresponding one of water inlet and outlet pipes (not shown) and extending through the opening 22 of the frame 20.

A valve stem 120 extends into the front and rear sections 92, 91 of the through bore and has a diameter smaller than that of the front section 92. The valve stem 120 is provided with a valve disc 123 which is disposed in the rear section 91 of the through bore and which divides the valve stem 120 into a front portion 121 that extends sealingly out of the valve housing 90 through a hole 151 formed in the front cover 150 and a rear portion 122 that extends into the rear section 91 of the through bore. The length of the rear portion 122 is preferably shorter than that of the rear section 91 of the through bore. The diameter of the valve disc 123 is preferably larger than that of the front section 92 of the through bore but smaller than that of the rear section 91. A first coil spring 130 is provided around the rear portion 122 of the valve stem 120 and biases the valve disc 123 away from the rear cover 140 so as to abut normally against the valve seat 911, thereby blocking normally communication between the front and rear sections 92, 91 of the through bore. A sealing ring 180 is provided on the valve seat 911. The coil spring 130 biases the valve disc 123 to abut tightly against the sealing ring 180 in order to prevent water in the rear section 91 of the through bore from leaking into the front section 92 of the latter.

The mounting seat 23 is formed with a cylindrical hole 30 that is aligned with the valve stem 121. A push rod 40 is received slidably in the cylindrical hole 30 and has an enlarged head portion 41 and a restricted shank portion 42. The shank portion 42 extends through the front wall 201 of the frame 20 and abuts against a distal end of the front portion 121 of the valve stem 120. A C-shaped locking ring 60 is secured on the shank portion 42 and is disposed adjacent to an inner wall surface of the front wall 201. A second coil spring 50 is provided in the cylindrical hole 30 and is disposed around the shank portion 42. The coil spring 50 biases the head portion 41 away from the front wall 201 of the frame 20 such that the locking ring 60 abuts tightly against the front wall 201. The head portion 41 is hollow and receives a bead 70 that extends outwardly therefrom.

The pedal 80 is a curved plate member with a knurled top surface and has a rear end that is connected pivotally to a top end of the mounting seat 23. The pedal 80 has a bottom surface which is provided with a downwardly extending push plate 81 that abuts against the bead 70 due to biasing action of the coil spring 50.

Figure 2:
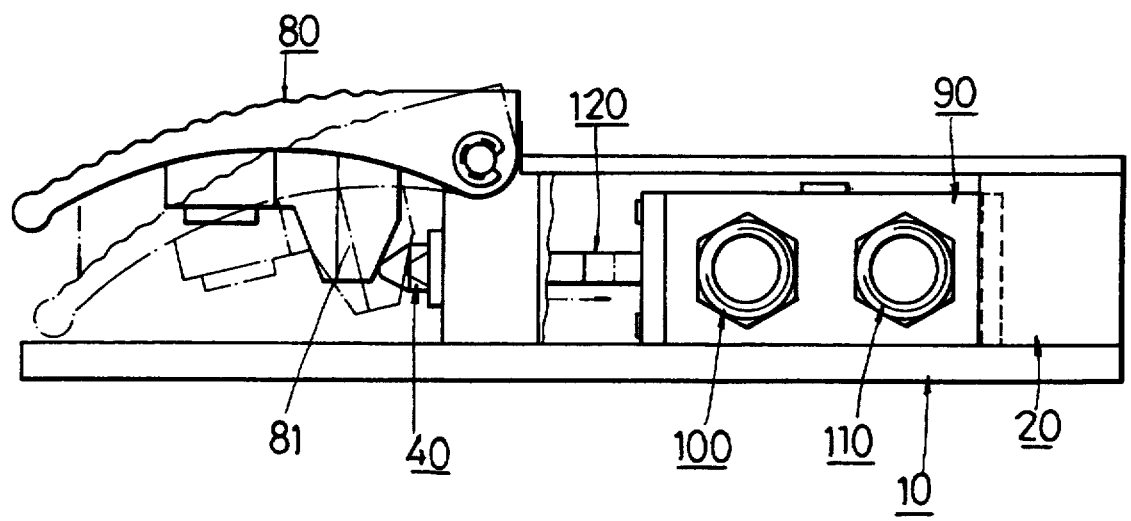
FIG. 2 is a side view of the preferred embodiment.

Referring to FIGS. 2 and 3, initially, when no pressure is applied on the pedal 80, the first coil spring 130 biases the valve disc 123 so as to abut normally against the sealing ring 180 on the valve seat 911, thereby blocking normally communication between the front and rear sections 92, 91 of the through bore. Water entering the rear section 91 of the through bore via the water inlet hole 94 is thus prevented from reaching the front section 92.

Referring to FIGS. 1, 2, 4 and 5, when pressure is applied on the pedal 80, the pedal 80 pivots downwardly relative to the mounting seat 23, thereby causing the push plate 81 to push the push rod 40 further into the cylindrical hole 30 against action of the second coil spring 50. The push rod 40 then pushes the valve stem 120 inwardly of the through bore to move the valve disc 123 away from the valve seat 911 against action of the first coil spring 130, thereby permitting water entering the rear section 91 of the through bore via the water inlet hole 94 to flow through the water outlet hole 93 via the front section 92. When the pressure on the pedal 80 is removed, the coil springs 50, 130 expand, thereby moving the valve stem 120 so as to enable the valve disc 123 to block once more the valve seat 911, and so as to cause upward pivoting movement of the pedal 80 to return the same to its original position.

In this embodiment, the valve stem 120 may be an integrally formed plastic piece or may comprise two connectable stainless steel pieces. Preferably, the materials used for the different elements of the present invention are rustproof and non-toxic, such as stainless steel, polypropylene, plastic steel, etc., in order to prevent water contamination. The sealing rings 160, 170, 180, used for preventing water leakage, are preferably of the type used in food products in order to further reduce the risk of contamination. The present invention is ideal for use in drinking fountains, sinks, and the like. Not only is the present invention convenient to use, it can also minimize the risk of infection because it obviates the need for operating the same by hand. Furthermore, the present invention can be used to provide varying amounts of water to satisfy the needs of different people.

While the present invention has been described in connection with what is considered the most practical and preferred embodiment[1], it is understood that this invention is not limited to the disclosed embodiment but is intended to cover various arrangements included within the spirit and scope of the broadest interpretation so as to encompass all such modifications and equivalent arrangements.

I claim:
1. A foot-operated valve, comprising:
a valve housing formed with a longitudinal bore which includes a front section and a rear section that has an internal diameter wider than that of said front section to form a shoulder which serves as a valve seat therebetween, said longitudinal bore having an open front end and a closed rear end, said valve housing being further formed with a water inlet hole that is communicated with said rear section of said longitudinal bore, and a water outlet hole that is communicated with said front section of said longitudinal bore;
a valve stem extending into said longitudinal bore and provided with a valve disc which is disposed in said rear section of said longitudinal bore, said valve stem having a front portion which extends sealingly through said open front end of said longitudinal bore;
a first spring means for biasing said valve disc to abut normally against said valve seat so as to block normally communication between said front and rear sections of said longitudinal bore;
a base for securing said valve housing thereon, said base being provided with an upwardly extending mounting seat disposed adjacent to said valve housing and formed with a cylindrical hole that is aligned with said valve stem;
a push rod received slidably in said cylindrical hole and having a head portion and a shank portion, said shank portion abutting against said front portion of said valve stem; and
a pedal having a rear end connected pivotally to said mounting seat and a bottom surface provided with a downwardly extending push plate that abuts against said head portion of said push rod;
whereby, application of pressure on said pedal causes said pedal to pivot, thereby causing said push plate to push said push rod further into said cylindrical hole so as to push said valve stem inwardly of said longitudinal bore to move said valve disc away from said valve seat against action of said first spring means to permit water entering said rear section of said longitudinal bore via said water inlet hole to flow through said water outlet hole via said front section of said longitudinal bore.

2. The foot-operated valve as claimed in claim 1, wherein said valve housing is formed as a rectangular block, and said base is provided with an upwardly extending rectangular frame that confines said valve housing therein.

3. The foot-operated valve as claimed in claim 2, wherein said frame has a side wall that is formed with an opening, and said water inlet and outlet holes are respectively provided with an internal screw thread, said foot-operated valve further comprising a pair of tube connectors, each of which having two threaded ends, one of which for engaging threadedly said internal screw thread of a corresponding one of said water inlet and outlet holes, the other one of which extending through said opening of said frame.

4. The foot-operated valve as claimed in claim 1, wherein said pedal is formed as a curved plate member with a knurled top surface.

5. The foot-operated valve as claimed in claim 1, further comprising a second spring means provided in said cylindrical hole to bias said head portion of said push rod toward said push plate of said pedal.

* * * * *